United States Patent [19]
Walter et al.

[11] 4,376,541
[45] Mar. 15, 1983

[54] AXIALLY AND RADIALLY EFFECTIVE BEARING SEAL

[75] Inventors: Wilhelm Walter, Reith; Peter Dreschmann, Dittelbrunn, both of Fed. Rep. of Germany

[73] Assignee: FAG Kugelfischer Georg Schäfer & Co., Schweinfurt, Fed. Rep. of Germany

[21] Appl. No.: 324,541

[22] Filed: Nov. 24, 1981

[30] Foreign Application Priority Data

Dec. 3, 1980 [DE] Fed. Rep. of Germany ... 8032122[U]

[51] Int. Cl.³ .............................................. F16J 15/32
[52] U.S. Cl. ..................................... 277/153; 277/50; 277/166; 308/187.2
[58] Field of Search ............... 277/152, 153, 165, 166, 277/47–50; 308/187.1, 187.2

[56] References Cited

U.S. PATENT DOCUMENTS

| | | | |
|---|---|---|---|
| 2,172,325 | 9/1939 | Victor et al. | 277/153 X |
| 3,022,081 | 2/1962 | Kosatka | 277/153 X |
| 3,400,989 | 9/1968 | Dixon et al. | 308/187.2 |
| 3,473,856 | 10/1969 | Helms | 308/187.2 |

FOREIGN PATENT DOCUMENTS

| | | | |
|---|---|---|---|
| 1945366 | 3/1971 | Fed. Rep. of Germany | 277/165 |
| 1448274 | 6/1966 | France | 308/187.2 |
| 415290 | 9/1934 | United Kingdom | 308/187.2 |
| 635790 | 4/1950 | United Kingdom | 308/187.2 |
| 962097 | 6/1964 | United Kingdom | 277/152 |
| 1296020 | 11/1972 | United Kingdom | 277/153 |

*Primary Examiner*—Robert S. Ward, Jr.
*Attorney, Agent, or Firm*—Karl F. Ross; Herbert Dubno

[57] ABSTRACT

A seal assembly engages between at least one body having an outwardly directed cylindrically annular surface centered on an axis and an annular and planar surface perpendicular to and centered on the axis and another body having an inwardly directed cylindrically annular surface centered on the axis. The seal assembly has a rigid C-section support ring fixed to the inwardly directed surface and open axially toward the planar surface, an elastomeric radial ring seal having an outer periphery vulcanized to the support ring and an inner periphery radially inwardly engaging the outwardly directed surface, and an elastomeric axial ring seal received in the support ring and engaging axially against the planar surface. Such a seal assembly is extremely compact so that it can be provided right in a roller bearing without substantially increasing its size. The radial seal can lie within the radial projection of the axial seal to give the arrangement a very short axial length.

10 Claims, 4 Drawing Figures

AXIALLY AND RADIALLY EFFECTIVE BEARING SEAL

FIELD OF THE INVENTION

The present invention relates to a seal. More particularly this invention concerns such a seal of the type which is normally used in a roller bearing and which is axially and radially effective between moving and non-moving radially and axially directed surfaces.

BACKGROUND OF THE INVENTION

An axially and radially effective roller-bearing seal is known from German utility model No. 1,958,382. This seal assembly has an elastomeric ring that is fitted against the radially inwardly directed surface of the outer bearing ring or race and that is formed with an axially open seat for an axial ring that bears axially against the perpendicular face of a washer or flange formed on a flange of a shaft. An L-section stiffening ring is provided in the elastomeric ring and a spring is braced between it and the lip of this ring carrying the axial section. A radial bearing is vulcanized to this stiffening ring and radially inwardly engages the radially outwardly directed surface of the shaft.

Such a bearing forms a relatively good seal. Its main disadvantage is that it is relatively bulky. The axial length in particular of such a bearing is relatively great so that it takes up more room than many applications have to spare.

OBJECTS OF THE INVENTION

It is therefore an object of the present invention to provide an improved axially and radially effective bearing seal assembly.

Another object is the provision of such an axially and radially effective bearing seal assembly which overcomes the above-given disadvantages.

A further object is to provide such a seal assembly which is particularly compact.

SUMMARY OF THE INVENTION

These objects are attained according to the instant invention in a seal assembly of the above-described general type, that is for engagement between at least one body having an outwardly directed cylindrically annular surface centered on an axis and an annular and planar surface perpendicular to and centered on the axis and another body having an inwardly directed cylindrically annular surface centered on the axis. The seal assembly according to the instant invention has a rigid C-section support ring fixed to the inwardly directed surface and open axially toward the planar surface, an elastomeric radial ring seal having an outer periphery vulcanized to the support ring and an inner periphery radially inwardly engaging the outwardly directed surface, and an elastomeric axial ring seal received in the support ring and engaging axially against the planar surface.

Such a seal assembly can be extremely compact so that it can be provided right in a roller bearing without substantially increasing its size. The radial seal can lie within the radial projection of the axial seal to give the arrangement a very short axial length.

According to another feature of this invention the assembly comprises a spring between the rigid support ring and the axial seal for urging some axially toward the planar surface. This spring can be a flat washer-type spring wholly contained in the C-section ring so that it is protected and completely out of the way.

The assembly may also be provided with a spring radially inwardly engaging the radial seal for urging same radially inward toward the outwardly directed surface of the inner ring or race. This spring may simply be a tension spring with its ends joined together.

The radial seal may have a flexible lip engaging the outwardly directed surface. The axial seal may similarly have ridges axially engaging the washer.

The inner ring according to this invention is formed with a circumferential groove. The washer has an inner periphery provided with an elastomeric cover and force-fitted in the groove.

The washer of this invention may also be unitary with a shaft carrying the inner ring. That is the washer may simply be a flange formed on this shaft.

The axial ring may be of X-section. It may also be solid and of rectangular section. In either case it bears wholly axially against the planar surface of the washer, while the radial seal bears wholly radially against the outwardly directed surface of the inner race or ring.

DESCRIPTION OF THE DRAWING

The above and other features and advantages will become more readily apparent from the following, reference being made to the accompanying drawing in which.

SPECIFIC DESCRIPTION

Figure 1:
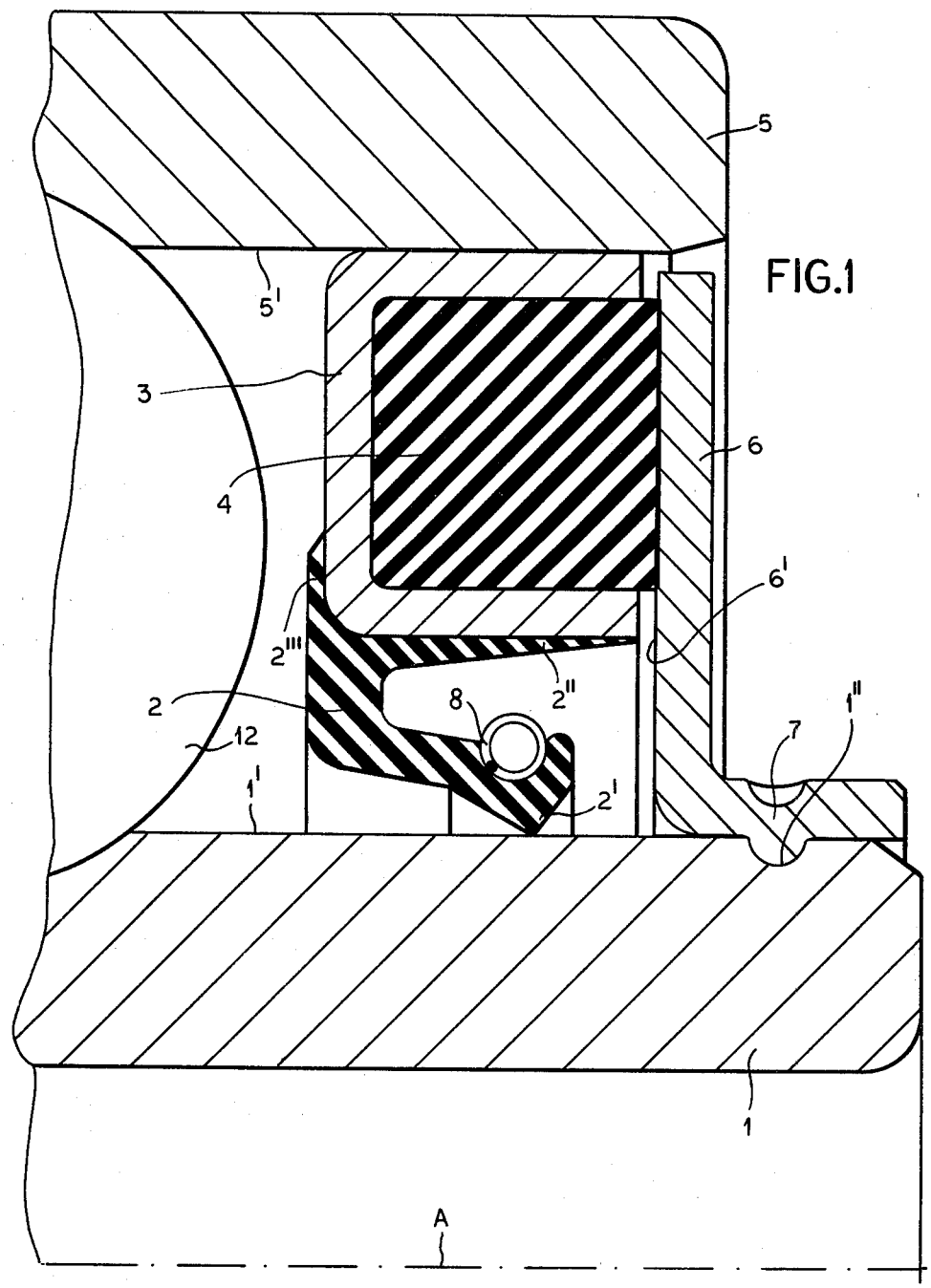
FIG. 1 is an axial section through a seal assembly according to this invention.

As shown in FIG. 1 a roller bearing has an inner ring or race 1 with a radially outwardly directed cylindrical surface 1', an outer ring or race 5 with a radially inwardly directed inner surface 5', and balls 12 riding between these races 1 and 5 which are both centered on an axis A shown slightly offcenter for illustration's sake. The inner race is formed with a radially outwardly open circumferential groove into which engage bumps 7 of a washer 6 having an annular and planar surface 6' extending perpendicular to the axis A, so that this washer 6, which is a standard feature intended to protect the interior of the bearing, is fixed to and rotates jointly with the inner race 1.

A seal assembly comprises a rigid metallic support ring of squared-off C-section opening axially toward the surface 6'. This support ring 3 is tightly fitted inside the outer race 5 so that it flatly engages the surface 5' and permits no foreign matter to enter the bearing between this surface 5' and the outer axial leg of the ring 3. The inner leg of the ring 3 is spaced radially outward from the outer surface 1' of the inner race 1.

A square-section elastomeric axial seal ring 4 is received in the C-section support ring 3 and projects axially slightly from it toward the washer 6 so that its one face flatly engages the surface 6'. Thus this seal 4 is an axial seal.

Another elastomeric seal ring 2 has a radially inwardly extending lip 2' that engages the surface 1' in line contact. An annular tension spring 8 urges this lip 2' radially inward into snug radial engagement with the surface 1' to create a second seal region between the relatively rotating parts 1 and 5. The seal 2 further has an axially extending lip 2" vulcanized to the inner leg of the C-section ring 3 and a radially extending lip 2'" vulcanized to the base of the ring 3 bridging its two legs. Thus the seal 2 is virtually integral with the ring 3.

Such a seal assembly is extremely compact. The radial seal 2 lies almost within the radial outlines of the axial seal 4, so that the entire arrangement, even though it is a duplex—axial and radial—seal, is extremely compact. In fact the system described above can be built into conventional roller bearings normally only provided with simplex rather than duplex seals.

Figure 2:
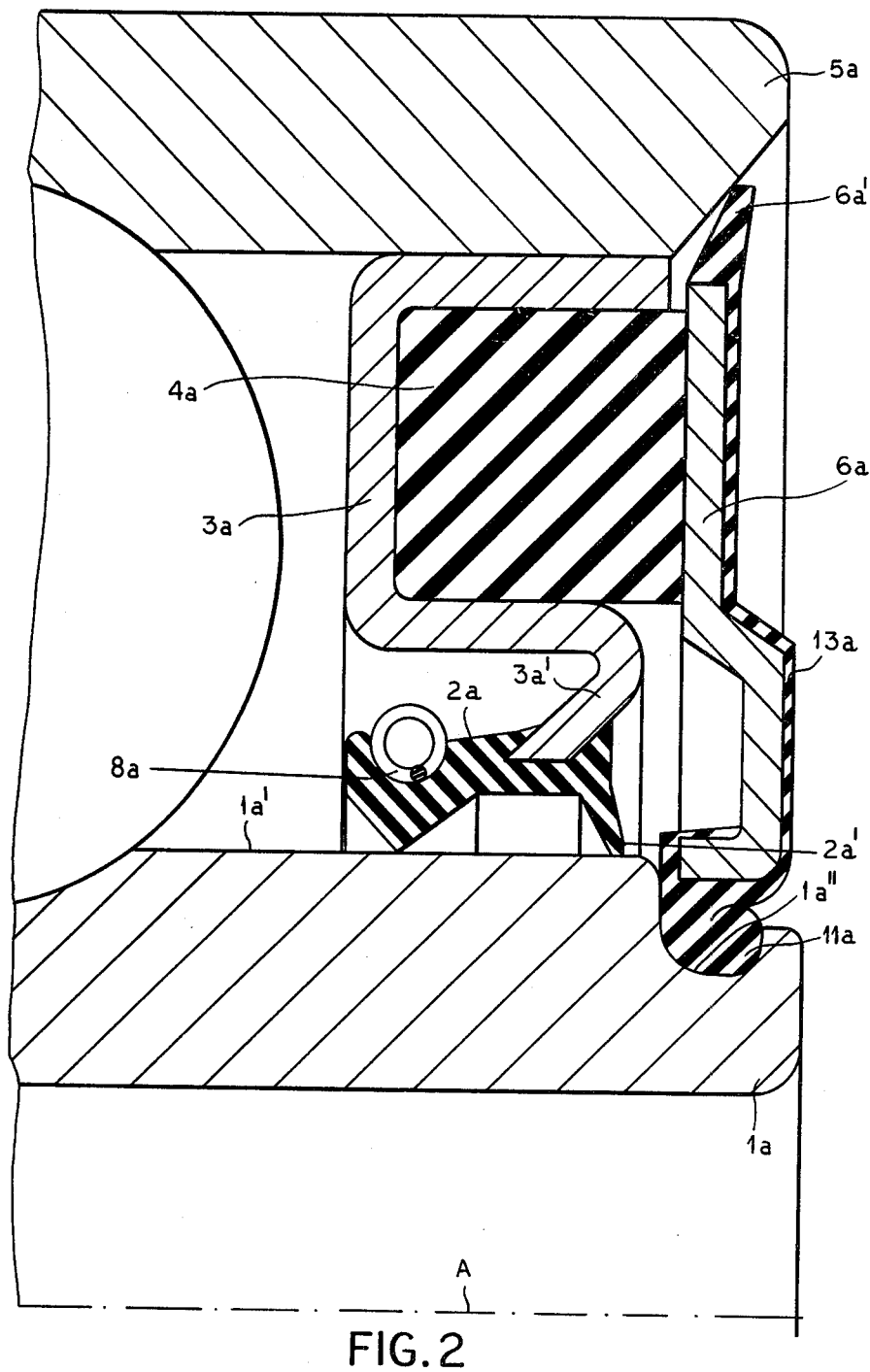
FIG. 2 is an axial section through a second embodiment of the assembly of this invention.

FIG. 2 shows an arrangement similar to that of FIG. 1, but where functionally identical parts have reference numbers bearing a postscript a. In this arrangement the inner leg of the C-section support ring 3a has an inclined edge or lip 3a' received in and vulcanized in a complementarily shaped groove in the radial seal 2a, which here has two lips 2a' engaging the surface 1a'.

In addition in FIG. 2 the washer 6a is not wholly of planar shape, and is covered with an elastomer forming a lip 6a' axially engaging the outer ring 5a in line contact and serving mainly to prevent the entry of dust. The inner periphery of this washer 6a is formed wholly by the elastomeric covering and is received in a force fit in the radially outwardly open groove 1a'''. Thus the entire washer 6a is suspended elastically on the bearing.

Figure 3:
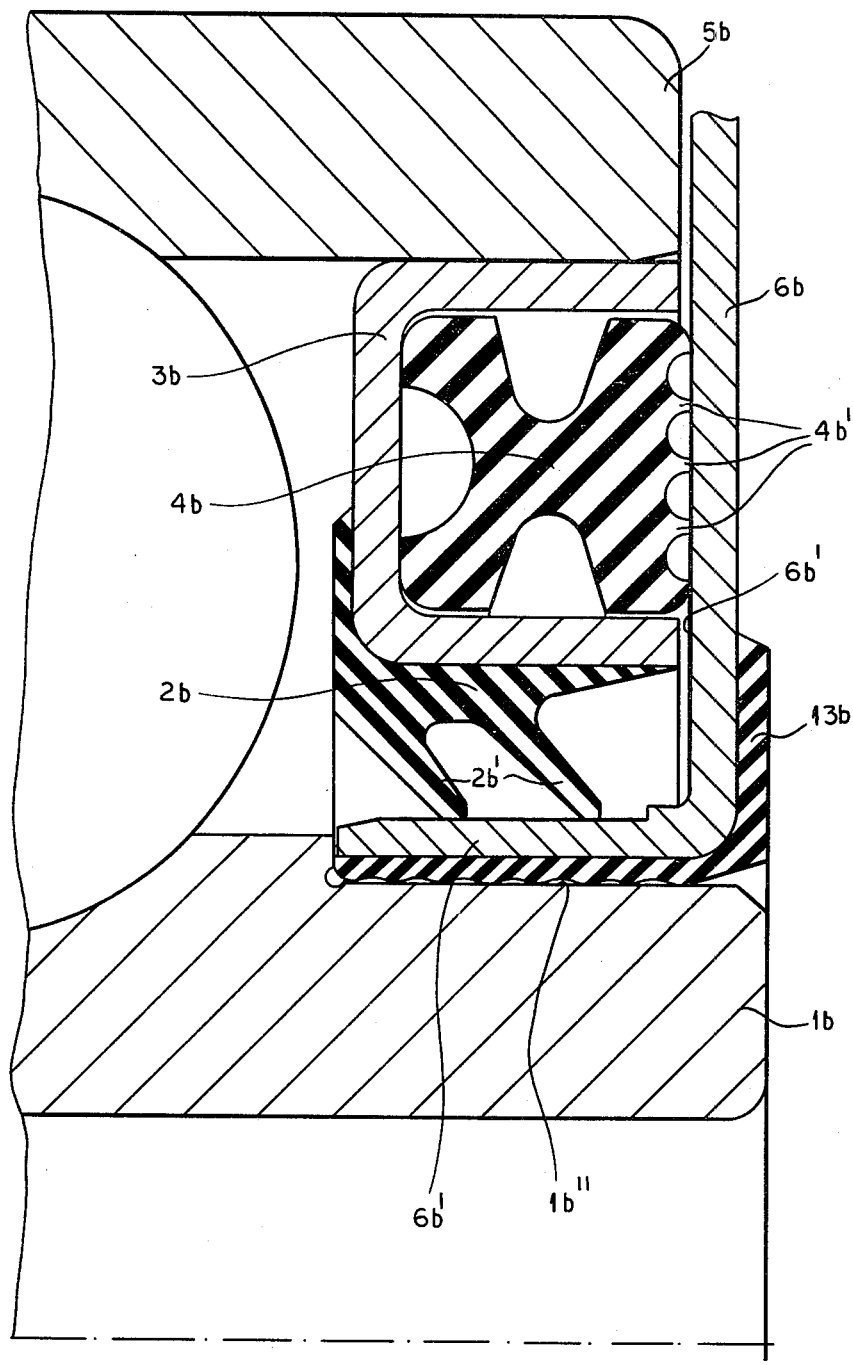
FIG. 3 is an axial section through a third embodiment at the assembly of this invention.

In FIG. 3 an L-section washer 6b is used that is partially covered with an elastomeric covering 13 and that has an inwardly directed leg 6b' whose radially inwardly directed face is wholly overlain by this cover 13. The inner race 1b is formed with a large inwardly and axially outwardly open groove 1b" into which this covered inner leg 6b' is force fitted.

In this arrangement the seal 2b has two relatively long lips 2b' that bear elastically inward on the inner surface of the leg 6b' which therefore forms a part of the ring or race 1b. No spring is needed with two such long lips as even unassisted they elastically engage with sufficient force for good sealing action.

In addition the axial seal 4b here is generally of X- or H-section and is formed with a plurality of annular ridges 4b' which axially engage the inner face 6b' of the washer 6b. Thus there are overall seven annular lines of contacts formed between the moving parts in the seal arrangement of FIG. 3, five engaging axially and two engaging radially.

Figure 4:
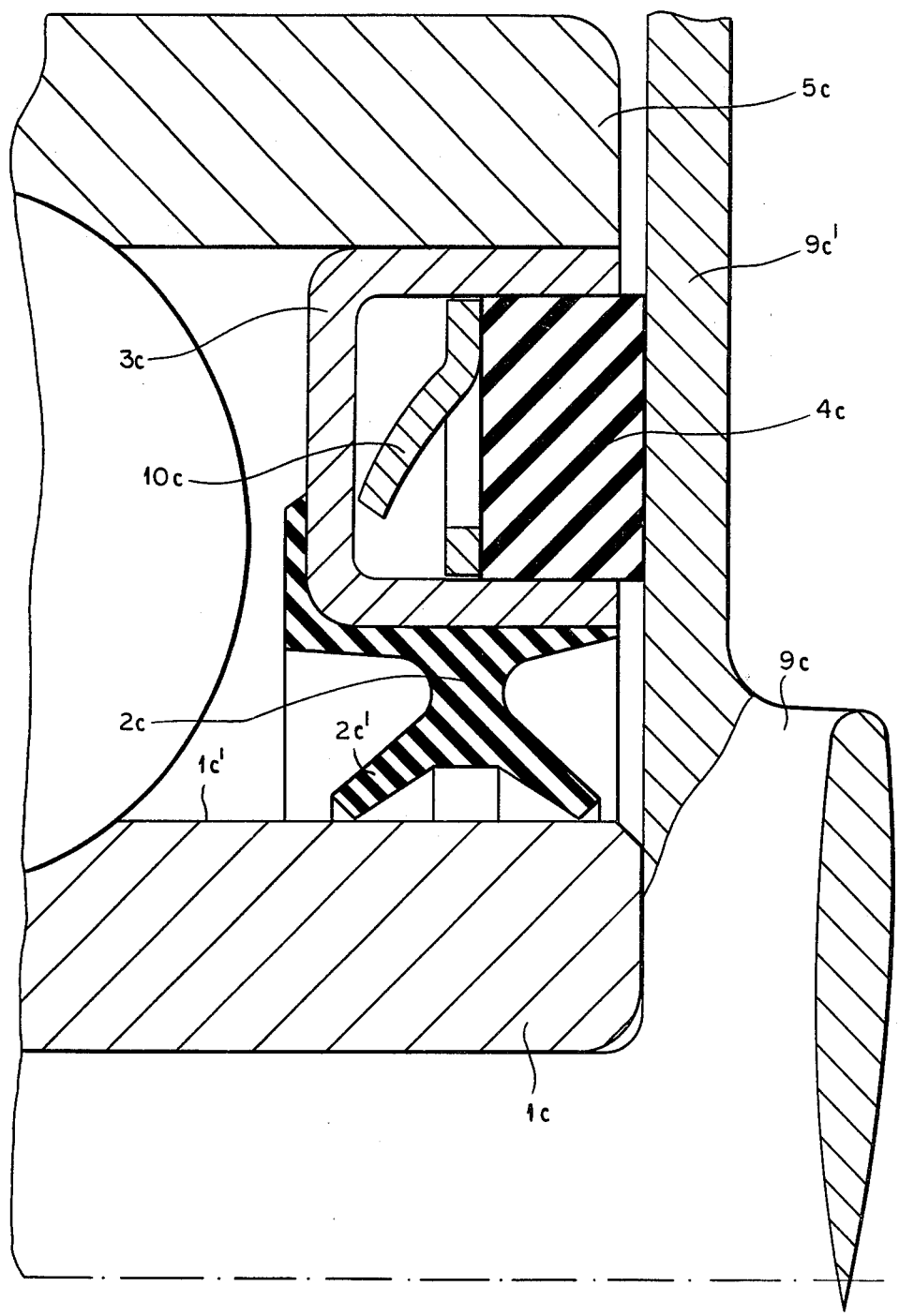
FIG. 4 is an axial section through a fourth embodiment of the assembly according to the invention.

FIG. 4 shows an arrangement similar to that of FIG. 1, except that an axially shorter axial seal 4c is used which is urged by means of a spring 10c into surface contact with a washer constituted by a flange 9c' formed on a shaft 9c carrying the inner race 1c. This spring 10c is of the washer type with bent-back tongues engaging elastically against the base of the C-section suppot ring 3c.

The radial seal 2c here is secured to the ring 3c in the same manner as in FIG. 1, but has two lips 2c' that engage the surface 1c' without the assistance of springs.

It can be seen that all of the assemblies according to this invention are extremely compact. In spite of their small size, they seal effectively, each creating several regions of sliding sealing contact that will effectively protect the interior of the bearing they are mounted in to hold in lubricant and keep out foreign matter. The assemblies can, nonetheless, be produced relatively easily and at low cost.

Even though the discussion above relates solely to use of the bearing assembly according to this invention in a roller bearing, it is possible to use it in another mechanism without in any way departing from the scope of the invention. As a simple shaft seal the assembly of this invention is particularly useful.

Furthermore any features of any embodiment of the invention can be combined with any features of any other embodiment, while remaining in the scope of the invention.

We claim:
1. A seal assembly for engagement between at least one body having an outwardly directed cylindrically annular surface centered on an axis and an annular and planar surface perpendicular to and centered on said axis and another body having an inwardly directed cylindrically annular surface centered on said axis, said seal assembly comprising:
   a rigid C-section support ring fixed to said inwardly directed surface and open axially toward said planar surface;
   an elastomeric radial ring seal having an outer periphery vulcanized to said support ring and an inner periphery radially inwardly engaging said outwardly directed surface; and
   an elastomeric axial ring seal received in said support ring and engaging axially against said planar surface.

2. The seal assembly defined in claim 1, further comprising a spring between said rigid support ring and said axial seal for urging same axially toward said planar surface.

3. The seal assembly defined in claim 1, further comprising a spring radially inwardly engaging said radial seal for urging same radially inward toward said outwardly directed surface.

4. The seal assembly defined in claim 1 wherein said radial seal has a flexible lip engaging said outwardly directed surface.

5. A seal assembly comprising:
   an outer ring having a radially inwardly directed cylindrical surface centered on an axis;
   an inner ring having a radially outwardly directed cylindrical surface centered on said axis;
   a washer secured to said inner ring and having an planar annular face perpendicular to said axis and generally between said cylindrical surfaces;
   a rigid C-section support ring fixed to said inwardly directed surface and open axially toward said planar surface;
   an elastomeric radial ring seal having an outer periphery vulcanized to said support ring and an inner periphery radially inwardly engaging said outwardly directed surface; and
   an elastomeric axial ring seal received in said support ring and engaged axially against said planar surface.

6. The seal assembly defined in claim 5 wherein inner ring is formed with a circumferential groove, said washer having an inner periphery provided with an elastomeric cover and force-fitted in said groove.

7. The seal assembly defined in claim 5 wherein said washer is unitary with a shaft carrying said inner ring.

8. The seal assembly defined in claim 5 wherein said axial ring is of X-section.

9. The seal assembly defined in claim 5 wherein said support ring has a pair of axially extending sides and a radially extending base bridging said sides.

10. The seal assembly defined in claim 5 wherein said axial ring is solid and of rectangular section.

* * * * *